United States Patent Office 3,445,801
Patented May 20, 1969

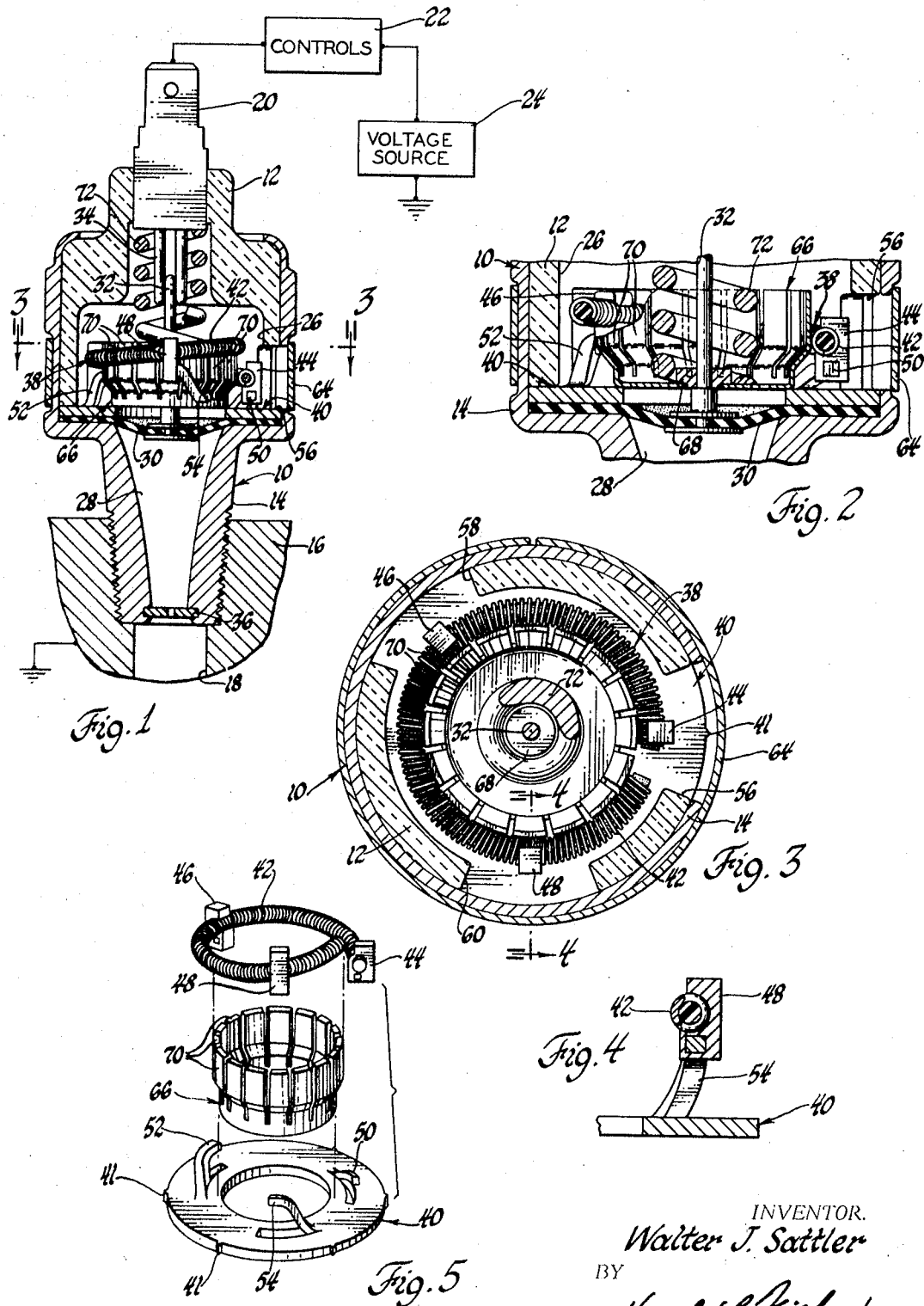

3,445,801
CONDITION RESPONSIVE TRANSDUCER
Walter J. Sattler, Flint, Mich., assignor to General Motors Corporation, Detroit, Mich., a corporation of Delaware
Filed Aug. 29, 1966, Ser. No. 575,673
Int. Cl. H01c 13/00
U.S. Cl. 338—42     12 Claims

ABSTRACT OF THE DISCLOSURE

A transducer incorporating a pressure responsive, flexible diaphragm that alters the point of engagement between a multifingered contact ring and a wire-wound resistor and, accordingly, the effective resistance with pressure variations. The resistor is formed in a spiral and adjustably supported at different elevations on a calibration plate so that different pressure versus resistance relationships can be obtained.

---

This invention relates to improvements in condition responsive transducers adapted, although not exclusively, to vary circuit impedances in response to changes in fluid pressure.

Transducers of the foregoing type normally develop a resistance that varies linearly with changes in pressure. If any other relationship is desired, either a different and very special type of transducer is required or major modifications must be made in an existing one. Of course, these special transducers can be expected to be very costly and complicated. Then too, problems with friction, backlash and inertia, particularly when rotating parts are involved, reduces the accuracy of the transducer.

Accordingly, a new and different transducer is proposed for overcoming the foregoing problems. Among the several objectives and features of this new and different transducer are the provision of an uncomplicated structure without sacrificing efficient operation, the avoidance of rotating parts, the overcoming of the adverse effects from friction, backlash and inertia, and the ability to respond in any desired way to a condition, e.g., either linearly or nonlinearly.

In a preferred embodiment of the invention, a housing, which is adapted to provide two electrical terminals, is divided into two parts by a flexible diaphragm. The flexible diaphragm affords direct, rectilinear movement of a contact element relative to a fixed impedance element. The contact element is connected to one of the terminals and the fixed impedance element is wound on a calibration member so as to be at different elevations both relative to the calibration member and the contact element. The fixed impedance element is connected to the other terminal through the calibration member. The different elevations are adjustable and are determined by the relationship wanted between the impedance and the changes in pressure. With this structure, as pressure changes deflect the flexible diaphragm, the contact element assumes different positions relative to the impedance element and, correspondingly, causes the impedance between the terminals to be varied according to the desired scheme.

The foregoing and other objects and advantages of the invention will become apparent from the description and the accompanying drawing, in which:

FIGURE 1 is a sectional view taken along the longitudinal axis of a transducer, incorporating the principles of the invention and arranged in a circuit shown schematically;

FIGURE 2 is a fragmentary, enlarged sectional view of the central portion of the FIGURE 1 transducer;

FIGURE 3 is a sectional view taken along line 3—3 in FIGURE 1;

FIGURE 4 is a fragmentary sectional view taken along line 4—4 of FIGURE 3; and

FIGURE 5 is an exploded view of the assembled parts shown in FIGURE 2.

Referring now to FIGURE 1 for the details of the transducer, the numeral 10 denotes a housing comprising an insulator body 12 of some suitable electrically inert material and a shell 14, which is clampingly joined to the insulator body 12. The shell 14 is threadedly attached to a grounded fitting 16 that is in communication with a source of fluid pressure, not shown, via a line 18. Therefore, the shell 14, as will become more apparent, serves as a grounded terminal. The insulator body 12 has a terminal 20 suitably joined thereto and is in circuit with controls 22 and a voltage source 24. The controls 22 may by way of example be a vehicle engine tell-tale lamp, which is energized at low oil pressures, a pressure gauge, a part of a vehicle electric fuel pump safety circuit that disconnects the pump from a voltage source when the engine oil pressure is low, or any of the usual read-out devices. As also will become apparent, the transducer serves to vary the impedance in the circuit in accordance with the pressure supplied to the line 18.

Dividing the combined insulator body 12 and shell 14 into upper and lower chambers 26 and 28 is a flexible diaphragm 30. This diaphragm 30 can be made of rubber or some similar type of material. Of course, the material will be determined by the use of the transducer and the kind of fluids employed. To the center of the flexible diaphragm 30 is connected a rod 32, which moves in a rectilinear path as the diaphragm 30 is flexed. The rod 32 is guided at its upper end within a guideway 34 formed as a part of the terminal 20. An orifice plate 36 is installed at the entrance to the lower chamber 28 so as to reduce the effect of pressure fluctuations in the line 18 on the pressure in the chamber 28.

Within the upper chamber 26 is positioned a variable impedance, which in this embodiment is a resistance device, generally denoted by the numeral 38. This device 38 includes a calibration plate 40 that is ring-shaped and is clampingly maintained in engagement with the periphery of the flexible diaphragm 30 by the crimping engagement between the insulator body 12 and the shell 14. This engagement exerts a downward force that serves to provide an effective fluid seal for isolating the upper and lower chambers 26 and 28. This plate 40 is formed of a conductive material, such as steel, and has an engagement with the shell 14 at one or more points 41 (see FIGURE 5) such that current flow can occur therebetween and to the grounded fitting 16. Joined to the calibration plate 40 is a wire-wound resistor 42, which can be wound on some suitable type of flexible fiber glass core. The resistor 42 is formed in a spiral and supported at different elevations so as to occur in different planes. This is achieved by using blocks 44, 46 and 48, as viewed in FIGURES 3, 4 and 5. These blocks 44, 46 and 48, as viewed in FIGURE 4, are in partial surrounding and clamping engagement with the resistor 42 and have at their bottom ends provision for connection to upstanding tangs 50, 52 and 54 on the calibration plate 40. The block 44 is made of a conductive material so that a current path can be established through different lengths of the resistor 42 and then through the block 44, its tang 50 to the calibration plate 40. The other two blocks 46 and 48 are formed of any well-known insulating material.

The tangs 50, 52 and 54 can be bent as desired so as to afford calibration by permitting the height of the resistor 42 relative to the calibration plate 40 to be adjusted. This is done by aligning the tangs 50, 52 and 54 respectively with the openings 56, 58 and 60 such that an appropriate tool can be inserted and the respective tang bent to change the elevation of the corresponding insulator block and accordingly the resistor 42 relative to the calibration plate 40. These openings 56, 58 and 60 are covered by a flexible band 64 to provide a dust-free enclosure after the calibration is made. The band 64 may be spot welded into place if wanted.

Positioned inside the area defined by the resistor 42 is a contact ring, denoted generally at 66. This contact ring 66 has multiple fingers 70 and as best shown in FIGURE 2, is fixedly joined to the rod 32 by a suitable connector 68. The contact ring 66 therefore follows the same rectilinear path as the rod 32 when the diaphragm 30 is flexed and the multiple fingers 70 engage certain parts o fthe inside of the resistor 42. The point of engagement of the fingers 70 with the resistor 42 is determined by the extent of upward movement of the contact ring 66. This will become more apparent from the operational summary that follows.

To summarize the operation, it will be assumed for exemplary purposes only that a linear resistance-pressure relationship is desired and that the blocks 44, 46 and 48 are adjusted along the resistor 42 respectively at starting or zero, 15 and 30 ohms resistance points. It is further assumed that these zero, 15 and 30 ohms resistance points are at elevations on the calibration plate 40 corresponding to 0, 40 and 80 p.s.i., respectively. Consequently, with a zero pressure in the lower chamber 28, the contact ring 66 will be in direct engagement with the calibration plate 40. This shunts the resistor 42. Of course, if preferred, this direct engagement can be avoided by having the contact ring 66 in a position such that the finger 70 thereof is in engagement with the zero ohms resistance point on the resistor 42 near or at the block 44. Current flow then would be through a minimum length of the resistor 42. With the mentioned direct contact, which is portrayed in FIGURES 1 and 2, the current path is from the terminal 20 through a conductive biasing spring 72, which returns or holds the flexible diaphragm 30 and, correspondingly, the contact ring 66 in the zero position, through the contact ring 66, the calibration plate 40, the shell 14 and the grounded fitting 16. It is preferred that the flexible diaphragm 30 always exert in the zero pressure position a slight compressive force on the spring 72. This avoids vibration induced noises and maintains part positions.

When the pressure in the chamber 28 increases to 40 p.s.i. the flexible diaphragm 30 will be moved upwardly and, also, the contact ring 66 so that one of the fingers 70 opposite the block 46 engages the resistor 42. Now the current in proceeding from the terminal 20, the spring 32 and the contact ring 66, passes through a 15 ohms resistance length of the resistor 42 extending from the point at block 46 to the point at block 44 and then to ground via the calibration plate 40, the shell 14 and the fitting 16.

At a pressure of 80 p.s.i. the diaphragm 30 is flexed further upwardly until another of the contact ring fingers 70 opposite the block 48 is in engagement with the resistor 42. As a result, the length of the resistor 42 extending from the block 48 to the block 44 is inserted in the circuit, i.e., the 30 ohms resistance.

As can now be appreciated, by removing the ring 64 a tool can be inserted within one of the openings 56, 58 or 60 and the elevation of the resistor 42 altered at one or more of the points by deflecting the appropriate upturned end 50, 52 or 54. In this way, then, the resistance sweep afforded can be made nonlinear, inverted, or formed so that the resistance follows a sine curve or some other curve. It will also be appreciated that there are no rotating parts to introduce errors in the results from the effects of friction, backlash or inertia.

The invention is to be limited only by the following claims.

I claim:
1. A condition responsive transducer comprising, in combination, a housing providing a pair of electric terminals, impedance means positioned within the housing, the impedance means including an arcuate impedance element connected to one terminal and formed so as to have portions thereof in a series of planes each of which is at a different elevation relative to the one terminal, a contact element connected to the other terminal and of substantially the same arcuate configuration as the impedance element, the contact element being movable in the direction of the elevations of the series of planes so as to engage a portion of the impedance element determined by the extent of movement of the contact element relative to the impedance element, and condition responsive means for varying the extent of movement of the contact element relative to the portions of the impedance element in response to variations in the condition so that a correspondingly varied impedance is provided between the terminals.

2. The condition responsive transducer described in claim 1 wherein the impedance element is formed in a spiral.

3. The condition responsive transducer described in claim 1 wherein the impedance means includes a calibration member adjustably supporting the impedance element within the housing so that the portions of the impedance element are at different elevations also relative to the calibration member.

4. The condition responsive transducer described in claim 3 wherein the condition responsive means includes a flexible member mounted within the housing and operatively connected to the contact element, the flexible member being arranged so as to deflect in response to variations in the condition and correspondingly maneuver the contact element relative to the impedance element.

5. The condition responsive transducer described in claim 4 wherein the impedance element is a resistor formed in a spiral on the calibration member and the housing includes spaced openings for permitting the adjustment of elevations of the portions of the resistor relative to the calibration member according to a certain relationship between variations in the condition and the resistance between the terminals.

6. The condition responsive transducer described in claim 5 wherein the certain relationship is nonlinear.

7. A pressure transducer comprising a housing providing a pair of electric terminals, a flexible diaphragm separating the housing into two chambers, a source of pressure communicating with one chamber, variable impedance means in the other chamber, the variable impedance means including an arcuate impedance element connected with one terminal and so formed as to have portions thereof each at different elevations relative to the one terminal, a multifingered contact element connected to the other terminal and of the arcuate configuration of the impedance element, the contact element being movable in the direction of the elevations of the impedance element portions so as to engage a portion determined by the extent of movement of the contact element relative to the impedance element, the contact element being maneuvered by the flexible diaphragm relative to the impedance element in response to variations in the pressure so that a correspondingly varied impedance is provided between the terminals.

8. The pressure transducer described in claim 7 wherein the impedance element is a resistor formed in a spiral configuration.

9. The pressure transducer described in claim 7 wherein the impedance element is a resistor and the variable impedance means further includes a calibration member mounted within the housing and adjustably supporting the resistor at certain points therealong so that the impedance element portions are at different elevations also relative to the calibration member.

10. The pressure transducer described in claim 8 wherein the variable impedance means further includes a calibration member mounted within the housing for adjustably supporting the resistor at certain points therealong, and the housing includes access openings opposite the certain points for permitting external adjustment of the elevation of the resistor relative to the calibration member so that a predetermined resistance sweep is provided during relative movement between the contact element and the resistor.

11. The pressure transducer described in claim 10 wherein the calibration member is both electrically connected to the housing and to one of the certain points along the resistor corresponding to a zero pressure, and including a bias spring that affords a current path between the one terminal and the contact member.

12. The pressure transducer described in claim 10 wherein the predetermined resistance sweep is nonlinear.

References Cited

UNITED STATES PATENTS

| | | | |
|---|---|---|---|
| 2,286,717 | 6/1942 | Clason | 338—42 |
| 2,525,095 | 10/1950 | Coxon et al. | 338—42 |
| 2,548,960 | 4/1951 | Ekstrom | 338—42 X |
| 2,911,606 | 11/1959 | Hoffman | 338—42 |
| 2,948,151 | 8/1960 | Astl | 73—406 |
| 3,032,733 | 5/1962 | Zuehlke et al. | |
| 3,289,136 | 11/1966 | Marks et al. | 338—42 |

REUBEN EPSTEIN, *Primary Examiner.*

U. S. Cl. X.R.

73—398, 406